United States Patent
Snell et al.

(10) Patent No.: US 6,591,968 B2
(45) Date of Patent: Jul. 15, 2003

(54) METHOD AND APPARATUS FOR CONDITIONING FEEDER CHAINS IN COMMERCIAL BAKING OVENS

(75) Inventors: Richard E. Snell, Raleigh, NC (US); Robert Floyd Lanham, Goldsboro, NC (US)

(73) Assignee: APV Baker, Inc. A division of APV North America, Inc., Goldsboro, NC (US)

( * ) Notice: Subject to any disclaimer, the term of this patent is extended or adjusted under 35 U.S.C. 154(b) by 0 days.

(21) Appl. No.: 09/949,439

(22) Filed: Sep. 7, 2001

(65) Prior Publication Data

US 2003/0047420 A1 Mar. 13, 2003

(51) Int. Cl.[7] ............................................. B65G 47/22
(52) U.S. Cl. ................................. 198/493; 198/500
(58) Field of Search ........................ 198/493, 500, 198/778; 184/15.1, 15.3

(56) References Cited

U.S. PATENT DOCUMENTS

| | | | | |
|---|---|---|---|---|
| 5,186,280 A | * | 2/1993 | Mattcheck | 198/500 X |
| 5,711,050 A | * | 1/1998 | Pimentel | 198/500 X |
| 5,772,003 A | * | 6/1998 | Hunt | 198/500 X |
| 5,989,609 A | * | 11/1999 | Kobussen et al. | 198/493 X |

* cited by examiner

*Primary Examiner*—James R. Bidwell
(74) *Attorney, Agent, or Firm*—Price, Heneveld, Cooper, DeWitt & Litton

(57) ABSTRACT

An apparatus and method for conditioning conveyor chains in commercial ovens of the type having a continuous conveyor chain supported in a track for transporting bakery products through the oven. A portion of the conveyor chain and supporting track transits outside the heated baking area of the oven and an automatic chain lubricator is positioned along the portion of the track transiting outside the baking area of the oven. A fan for creating a flow of cooling air and at least one air duct are located outside the baking area. The duct receives one end cooling air from the fan and directs the cooling air on to the conveyor chain along the portion thereof located outside the heated baking area of the oven and upstream from the lubricator. Also, an air knife is disposed upstream of the lubricator and directed onto the chain to remove undesired debris, etc., therefrom.

22 Claims, 3 Drawing Sheets

METHOD AND APPARATUS FOR CONDITIONING FEEDER CHAINS IN COMMERCIAL BAKING OVENS

BACKGROUND OF THE INVENTION

Modem bakery operations use conveyorized ovens incorporating long continuous chains supporting grids upon which bakery products in pans are transported throughout the oven for baking. The chain utilized in these ovens can be of considerable length, often greater than 1,000 feet, and since it is in the oven the majority of the time, the chain becomes very hot, rising to temperatures which are close to that of the inside of the oven, often as much as 450° to 480°. The chain is supported on a large number of wheels running in a partially enclosed track. Each of the wheels is rotatingly mounted by a bearing and the proper operation of these wheels and bearings is critical to the efficient operation of the oven. A failure of one or more bearings causes additional loading on adjacent wheels and bearings and can cause premature wear or serious friction damage to the track material. Therefore, in order to keep the bearings operating efficiently they are lubricated by a high speed oil injector system which operates at regular intervals, typically every three to four hours.

Because the ovens are used in the preparation of food articles, only a limited number of approved lubricants can be used, and all of the available and affordable lubricants have degraded performance at oven baking temperatures, evaporating quickly or degenerating to carbon deposits which obstruct subsequent lubricant application.

The failure of the lubricant to fully penetrate and carry the lubricant to the center of the bearing causes premature bearing failure and thus higher operating costs and increased down time to repair the oven. An alternative method of lubricating the chain and bearings is accomplished by turning the oven off and allowing the chain to cool. After the chain has cooled, the wheels and bearings can be lubricated without the problem of premature evaporation of the lubricant carrier. However, this method requires extensive down time of the oven since the oven must be turned off and allowed to cool prior to lubricating the chain, and this adversely impacts the productivity of the oven.

Thus, there is a need within the industry for a new and improved method and apparatus by which such oven conveyor chains may be more effectively lubricated, in a manner such that the lubricant penetrates throughout the bearing while minimizing the down time of the oven.

SUMMARY OF THE INVENTION

One aspect of the present invention is an apparatus for conditioning conveyor chains in commercial ovens of the type having a continuous conveyor chain supported by a track for transporting bakery products through the oven. A portion of the conveyor chain and supporting track transits outside the heated area of the oven to facilitate the adding and removal of bakery products to be conveyed through the oven for baking. The conditioning apparatus includes a fan for creating a flow of cooling air, and at least one air duct having one end proximate to the fan for receiving a portion of the flow of cooling air and a second end disposed proximate the conveyor chain along the portion thereof located outside the heated baking area of the oven, at a point upstream for the lubricator, wherein the second end of the duct directs a flow of air across the conveyor chain at that point.

Another aspect of the present invention is a method of conditioning conveyor chains in commercial ovens of the type having a continuous conveyor chain including wheels and bearings and disposed in or on a fixed track for transporting bakery products through the oven. A portion of the conveyor chain and fixed track transits outside the heated area of the oven to permit the adding and removing of bakery products for baking in the oven. An automatic chain lubricator is positioned along the portion of the fixed track transiting after the cooler outside the heated area of the oven. The method comprises the steps of establishing a flow of cooling air of a lower temperature than the conveyor chain; directing the cooling air flow onto the conveyor chain while the chain is exterior to the heated area of the oven; and, at predetermined intervals, injecting a flow of lubricant into the bearings of the wheels of the conveyor chain.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
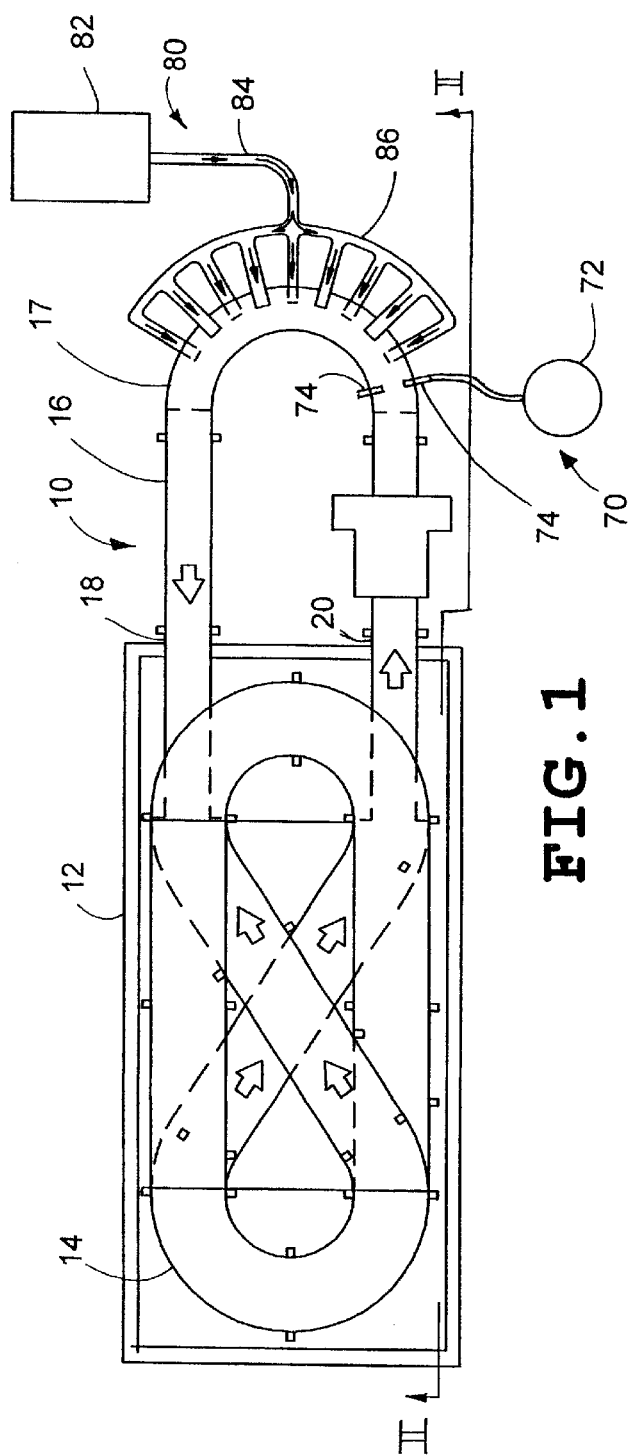
FIG. 1 is a plan view showing one example of a conveyorized oven, having a portion of the conveyor exterior to the oven and including a chain-conditioning system embodying the present invention.
Figure 2:
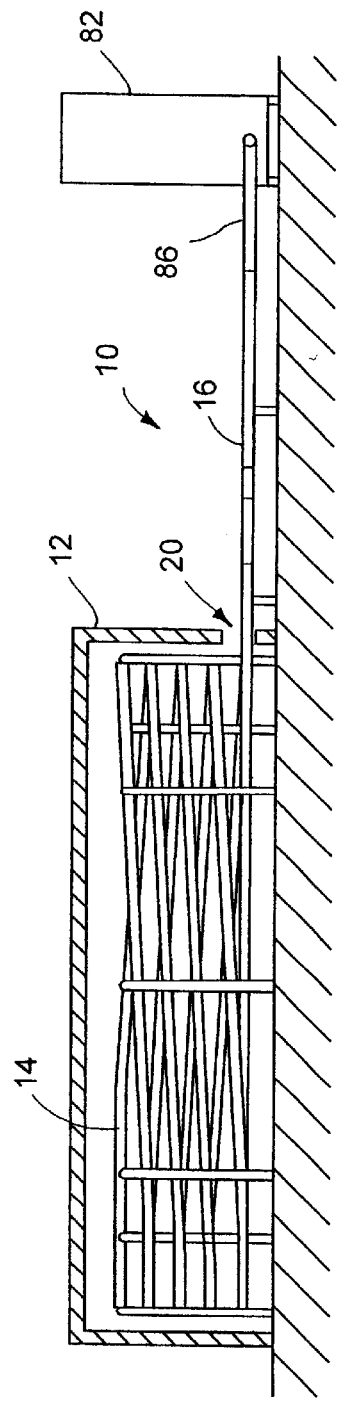
FIG. 2 is a side elevational view taken along plane II—II of FIG. 1.
Figure 3:
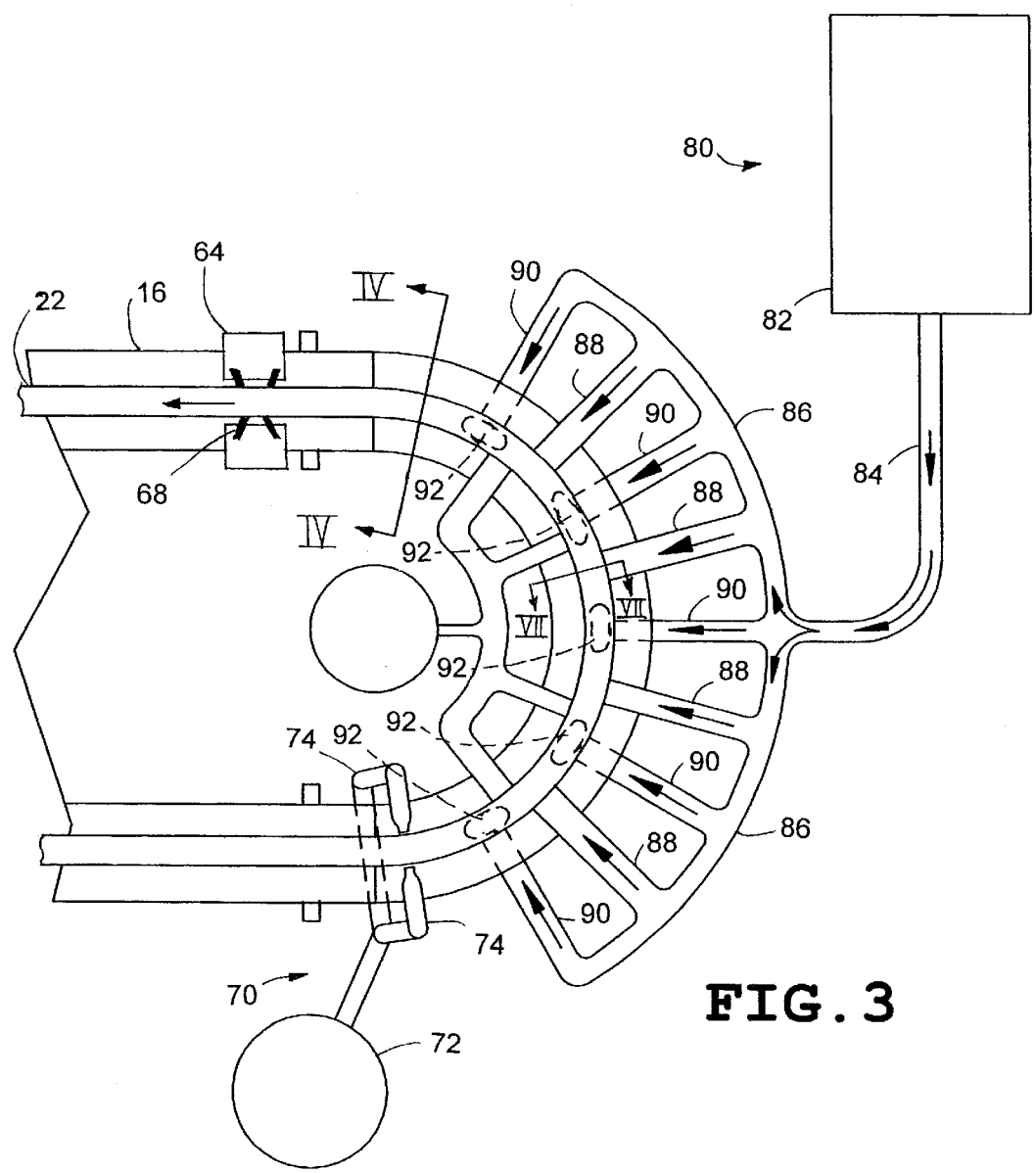
FIG. 3 is a fragmentary enlarged top plan view of the conditioning system.
Figure 4:
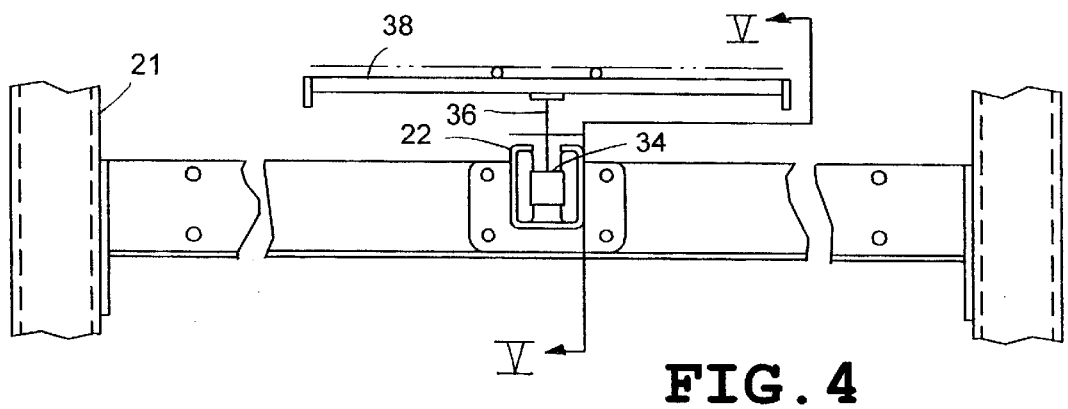
FIG. 4 is a further enlarged fragmentary cross-sectional view of the conveyor taken along plane IV—IV of FIG. 3.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Reference numeral 10 in FIGS. 1 and 2 generally designates a conveyorized commercial oven system which in this case includes a conveyor chain conditioning system embodying the present invention, which is particularly designed to cool the conveyor chain of such an oven and thereby facilitate proper lubrication thereof. In the illustrated example, a typical conveyorized commercial oven of the "Lanham type" is shown in FIGS. 1 and 2, which includes an oven enclosure 12 within which a conveyor 14 travels on a "figure-eight" shaped (or oval or double oval) vertically layered endless path while carrying product through the oven for baking. While the majority of conveyor 14 is located inside the oven enclosure 12, a portion 16 of conveyor 14 extends outside of oven enclosure 12 between an entrance opening 18 and an exit opening 20. Conveyor portion 16 typically has a movable U-shaped section 17 which can be moved and adjusted with respect to the remainder of conveyor 14 to compensate for thermal expansion or contraction and for wear. U-shaped section 17 has connected thereto a chain-cooling system 80 and an "air knife" 70 which comprise one embodiment of the present invention. The most convenient location for the system 80 is in the curve of the conveyor between the load on and load off of the oven, but it could be located on any straight or curved section, best results being achieved by the maximum cooling of the chain before the lubricator (described hereinafter). The structure and operation of the preferred embodiment is discussed in detail below.

Figure 6:
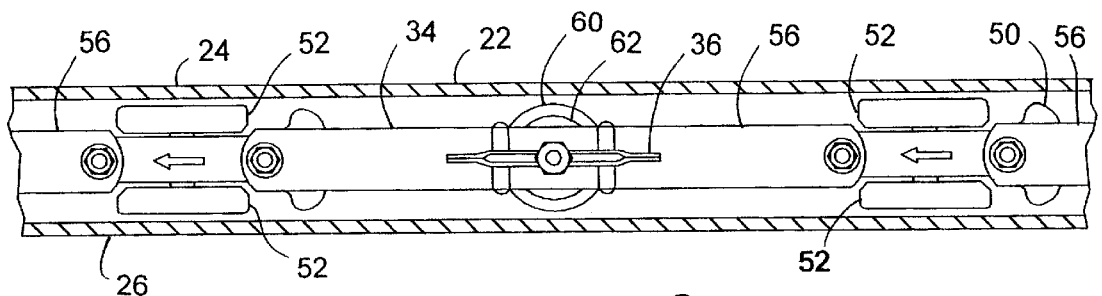
FIG. 6 is a fragmentary sectional top plan view of the conveyor chain in the fixed track, taken along the plane VI—VI of FIG. 5.
Figure 5:
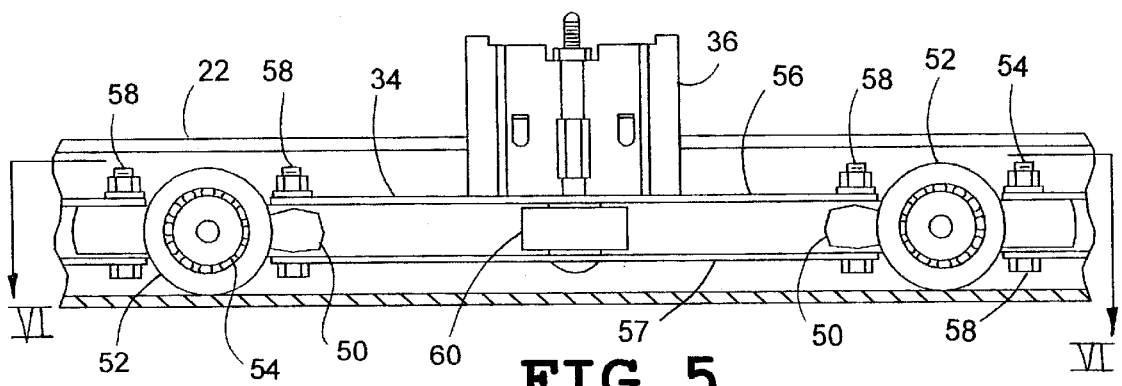
FIG. 5 is a fragmentary sectional elevational view of the conveyor chain in the conveyor track, taken along the plane V—V of FIG. 4.
Figure 7:
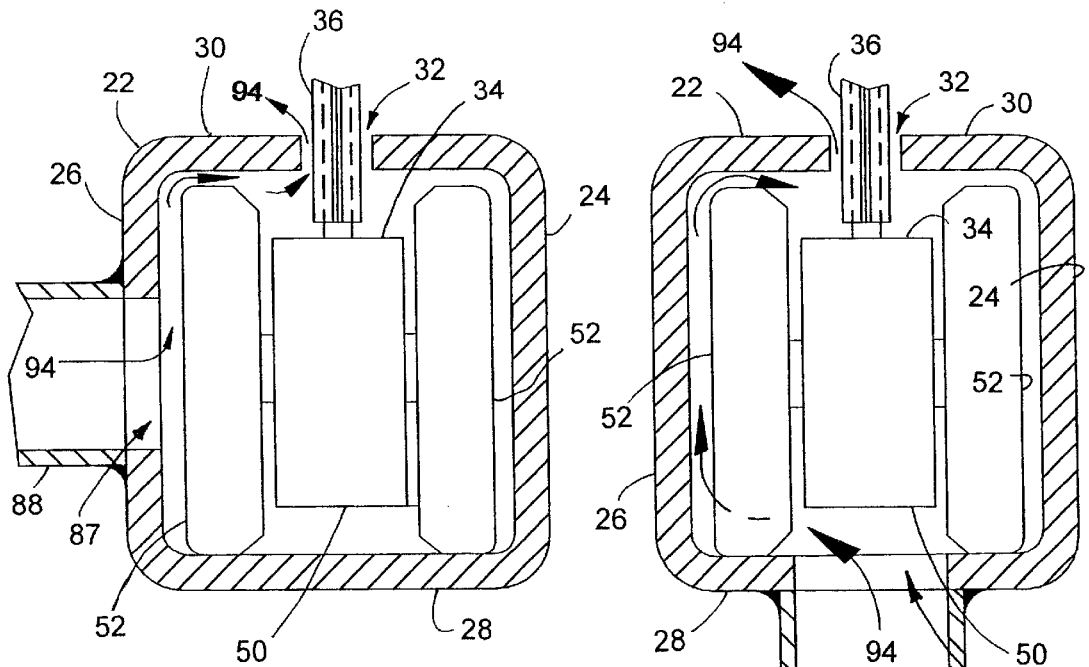
FIG. 7 is a further enlarged, fragmentary sectional view of the fixed track having a cooling duct attached to the sides of the track, taken along the plane VII—VII of FIG. 3.
Figure 8:
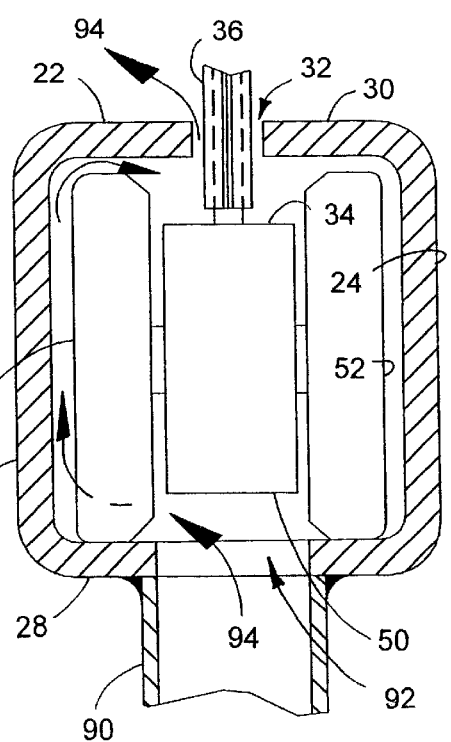
FIG. 8 is a fragmentary, cross-sectional view similar to FIG. 7 and on the same scale, showing the fixed track having a cooling duct attached to a bottom of the track, taken along the plane VIII—VIII of FIG. 3.

Referring to FIGS. 3–6, conveyor 14, of which external portion 16 is a part includes a central fixed track 22 supported in the desired looping and/or spiraling pattern by support structure 21. Track 22 (as shown in FIGS. 7 and 8) is generally rectangular in cross section having a bottom 28, an inside track wall 24, an outside track wall 26, and a top 30. Top 30 has a slot 32 therein. Slot 32 extends the entire length of track 22. As shown in FIGS. 5 and 6, a conveyor chain 34 is housed within track 22 for continuous movement along the length of conveyor 14. Conveyor chain 34 supports a plurality of regularly spaced pendants 36 therealong which extend vertically through slot 32 and support a plurality of grids 38 for carrying pans or trays of dough or the like to be baked in oven 10.

Referring again to FIGS. 5 and 6, conveyor chain 34 includes a plurality of regularly spaced drive links 50 which support at a central portion thereof a pair of vertical wheels 52 which are rotatingly support by vertical bearings 54. Successive or adjacent drive links 50 are interconnected one to the other by upper and lower connector links 56 and 57. Ends of upper connector link 56 overlay a top end surface of adjacent connector links 50 and lower connector links 57 underlay lower surfaces of adjacent connector links 50. Connector links 56 and 57 are pivotally joined to connector links 50 by connector bolts 58 in such a manner to form conveyor chain 34 of alternating drive links 50 and pairs of connector links 56 and 57. Vertical wheels 52 support chain 34 on bottom 28 of fixed track 22. A horizontal wheel 60 is mounted between each upper and lower connector link 56 and 57, respectively, substantially at a midpoint along connector links 56 and 57. Horizontal wheel 60 is rotatingly supported by bearing 62 and provides lateral stability to chain 34 by rotating contact with either of side walls 24 or 26.

Referring again to FIG. 3, an automatic lubricating system 64 is typically installed to automatically apply lubricant to vertical and horizontal bearings 54 and 62 as they transit along track 22 along the exterior portion 16 of conveyor 14.

Referring again to FIGS. 3, 7, and 8, one embodiment of a cooling apparatus for chain 34 in accordance with the invention is shown generally at 80. Cooling apparatus 80 includes a high-volume fan 82 which collects ambient air and directs the air into flexible duct 84. Duct 84 in the preferred embodiment is flexible to permit the stationary mounting of fan 82 while permitting U-shaped section 17 of conveyor 14 to be positionally adjusted to compensate for thermal expansion and wear on conveyor 14. Flexible delivery duct 84 is connected to air distributor 86, which distributes the air-flow along the exterior curved portion of track 22 via a plurality of cooling ducts 88 and 90. Since conveyor chain 34 includes both horizontally and vertically oriented elements, it is desirable to provide both a horizontal and a vertical air flow against chain 34, to maximize the cooling effect. Thus, in the preferred embodiment shown, both horizontal cooling ducts 88 and vertical cooling ducts 90 are attached to track 22 to deliver cooling air therein.

FIG. 7 illustrates the attachment of a horizontal cooling duct to track 22. Track 22 has an aperture 87 formed in outside wall 26 of track 22, and horizontal cooling duct 88 is attached thereto so that air flow 94 flows from duct 88 to an interior portion of track 22. The air circulates around chain 34 and exits through slot 32 into the ambient area of the room or building housing the oven system 10. As conveyor chain 34 transits through U-shaped section 17 of conveyor 14, horizontal wheels 60 bear against inside wall 24 of track 22. It is desirable to maintain a continuous surface for wheel 60 to bear against, for maintaining smooth operation of conveyor chain 34. Therefore, apertures 87 are formed in outside track wall 26 to prevent discontinuities in the wall surface against which horizontal wheel 60 bears.

Similarly, as shown in FIG. 8, bottom apertures 92 are formed in track bottom 28 and vertical cooling ducts 90 are attached thereto in such a manner as to permit air flow 94 to flow from the bottom of track 22 across chain 34 to exit slot 32 in top 30 of track 22. Apertures 92 are positioned centrally in bottom 28 thereby maintaining a continuous surface adjacent the sides of track 22 upon which wheels 52 will bear as chain 34 transits through U-shaped section 17 of track 22. Preferably, apertures 92 are slot-like in nature, being elongated along lengthwise of track 22 (see FIG. 9), with box-like plenums (not shown) below them (under the track) to help distribute the air flow along their length. It will be understood that the number, location, and orientation slots 92, of cooling ducts 88 and 90 can be varied and altered to facilitate alternate track and conveyor chain configurations.

Referring again to FIG. 3, an air knife system 70 is also preferably included upstream from cooling system 80. Since the lubricants delivered to the hot chain 34 by automatic lubricating system 64 tend to leave deposits on conveyor chain 34, and some of these deposits can fall or be dislodged from chain 34, the flow of cooling air from cooling system 80 could potentially result in the unwanted distribution of dirt particles throughout the ambient air in the vicinity of the area on which baking products are onloaded and offloaded to conveyor 14. Thus, it is desirable to remove as much of such deposits from conveyor chain 34 as possible. In the present embodiment, these deposits are removed by air knife system 70. Air knives are generally well-known in industry. The air knife envisioned for use to remove deposits from the conveyor chain 34 includes a high-pressure air supply 72 which directs high-pressure air to one or more air knife nozzles 74 in such a manner as to direct a high velocity, high pressure stream of air across conveyor chain 34, to dislodge the maximum amount of lubricant and dirt deposits therefrom. Air knife system 70 is preferably positioned upstream from cooling system 80, so that deposits can be stripped and collected from conveyor chain 34 before it is subjected to cooling air flow and thereby minimizing the amount of dirt particles which are carried into the ambient air by air flow 94. The deposits and dirt dislodged by nozzles 74 can be collected and disposed of in a generally know manner.

In operation, as conveyor chain 34 transits through exit opening 20 of oven enclosure 12 at the beginning of the automatic lubricating system, air knife 70 begins operation to dislodge built-up lubricant deposits and dirt from chain 34. As chain 34 transits through U-shaped section 17 of track 22, high-volume fan 82 collects ambient air, typically at 80° to 90° F. and feeds the air through duct 84 to distributor 86. The air is further distributed to cooling duct 88 and 90, to be blow across chain 34 at a plurality of locations. Automatic lubricator 64 also begins operation to inject lubricant into bearings 54 and 62 through injectors 68. Once the entire length of chain 34 has made the complete circuit of conveyor 14, automatic lubrication system 64, air knife, 70, and cooling system 80 are disabled until the next timed automatic lubrication cycle is to be accomplished, wherein the process is repeated.

The above description is considered that of the preferred embodiments only. Modifications of the invention may well occur to those skilled in the art and to those who use or otherwise learn of the invention. Therefore, it is understood that the embodiments shown in the drawings and described above are merely for illustrative purposes and should not be used to limit the scope of the invention, which is defined by the following claims as interpreted according to the principles of patent law, including the Doctrine of Equivalents.

The invention claimed is:

1. An apparatus for conditioning bakery product conveyor chains in commercial ovens of the type having a continuous conveyor chain supported in a track for transporting bakery products through the oven, wherein a portion of the conveyor chain and fixed track transits outside the heated baking area of the oven to permit the loading and removal of bakery products for baking in the oven, and further wherein an automatic chain lubricator is positioned along the portion of the fixed track transiting outside the heated baking area of the oven, said apparatus for conditioning comprising:

a fan for creating a flow of cooling air; and at least one air duct having a first opening proximate to said fan for receiving a portion of said flow of cooling air and a second opening proximate to said conveyor chain at a point located along the portion outside the heated area of the oven, said second opening arranged to direct said flow of air onto said conveyor chain.

2. The apparatus according to claim 1, wherein said second opening of said at least one air duct is positioned upstream from the automatic chain lubricator.

3. The apparatus according to claim 2, wherein said second opening of said at least one air duct is attached to said track and arranged to direct said cooling air to an interior portion of the track.

4. The apparatus according to claim 3, wherein said at least one air duct is oriented along a first axis substantially normal to the direction of travel of the conveyor chain.

5. The apparatus according to claim 4 further including at least a second air duct oriented along a second axis.

6. The apparatus according to claim 5, wherein said second air duct is attached to the supporting track for directing said cooling air to an interior portion of the track.

7. The apparatus according to claim 6, wherein said second axis is substantially normal to said first axis and to said direction of travel of the conveyor chain.

8. The apparatus according to claim 7 including a plurality of air ducts attached to the track.

9. The apparatus according to claim 8, wherein an orientation of said air ducts alternates between said first axis and said second axis.

10. The apparatus according to claim 1 further including an air knife for directing a high-pressure air stream against the conveyor chain to remove undesired debris from the conveyor chain.

11. The apparatus according to claim 8, wherein said air knife is positioned upstream from said at least one air duct.

12. The method of conditioning conveyor chains in commercial ovens of the type having a continuous conveyor chain which includes wheels and bearings and is disposed in a track for transporting bakery products through the oven, wherein a portion of the conveyor chain and track transits outside the heated baking area of the oven to permit the adding and removing of bakery products for baking in the oven, and further wherein an automatic chain lubricator is positioned along the portion of the track transiting outside the heated baking area of the oven, said method comprising the steps:

establishing a flow of cooling air of a lower temperature than the conveyor chain;

directing the cooling air flow onto the conveyor chain while the chain is exterior to the heated area of the oven; and injecting lubricant into the bearings of the wheels of the conveyor chain.

13. The method according to claim 12, wherein said directing step includes directing the cooling air onto the conveyor chain in an interior portion of the track.

14. The method according to claim 13, wherein said directing step includes directing the cooling air through at least one duct.

15. The method according to claim 14, wherein said directing step includes directing the cooling air through the duct along a first axis normal to the direction of travel of the conveyor chain.

16. The method according to claim 15, wherein said directing step includes directing the cooling air through a second duct.

17. The method according to claim 16, wherein said directing step includes directing the cooling air through the second duct along an axis substantially normal to the first axis and to the direction of travel of the conveyor chain.

18. The method according to claim 17, wherein said directing step includes directing the cooling air through a plurality of alternating first and second cooling ducts.

19. The method according to claim 18, wherein said injecting step is performed at intervals between alternating first and second ducts.

20. The method according to claim 12 further including, prior to said directing step, the step of:

cleaning undesired debris from the conveyor chain.

21. The method according to claim 20, wherein said cleaning step includes directing a highpressure stream of air onto the conveyor chain.

22. The method according to claim 21, wherein said cleaning step of directing a high-pressure stream of air comprises using an air knife.

* * * * *